(12) United States Patent
Mawhinney

(10) Patent No.: US 8,456,114 B2
(45) Date of Patent: Jun. 4, 2013

(54) MOTOR BUS VOLTAGE COMMUTATION METHOD

(75) Inventor: Joel Mawhinney, San Diego, CA (US)

(73) Assignee: Hamilton Sundstrand Corporation, Windsor Locks,, CT (US)

( * ) Notice: Subject to any disclaimer, the term of this patent is extended or adjusted under 35 U.S.C. 154(b) by 449 days.

(21) Appl. No.: 12/788,337

(22) Filed: May 27, 2010

(65) Prior Publication Data

US 2011/0291598 A1   Dec. 1, 2011

(51) Int. Cl.
*H02P 6/00*   (2006.01)

(52) U.S. Cl.
USPC ................... 318/400.01; 318/400.14

(58) Field of Classification Search
USPC .............. 318/400.01, 400.14, 400.17, 400.38
See application file for complete search history.

(56) References Cited

U.S. PATENT DOCUMENTS

| | | | |
|---|---|---|---|
| 4,818,908 A * | 4/1989 | Tamae et al. ................. | 310/171 |
| 4,894,613 A | 1/1990 | Tsugawa | |
| 5,229,693 A * | 7/1993 | Futami et al. ............ | 318/400.14 |
| 5,289,088 A | 2/1994 | Andoh | |
| 5,359,245 A | 10/1994 | Takei | |
| 5,461,311 A | 10/1995 | Nakazato et al. | |
| 5,536,983 A | 7/1996 | Araki et al. | |
| 5,640,073 A * | 6/1997 | Ikeda et al. ............... | 318/400.03 |
| 5,717,297 A | 2/1998 | Karwath et al. | |
| 5,757,091 A | 5/1998 | Sogabe et al. | |
| 6,054,783 A | 4/2000 | Philipp et al. | |
| 6,100,662 A * | 8/2000 | Hansen ......................... | 318/685 |
| 6,211,633 B1 | 4/2001 | Jones et al. | |
| 6,359,412 B1 | 3/2002 | Heglund | |
| 6,891,346 B2 | 5/2005 | Simmons et al. | |
| 7,638,959 B2 | 12/2009 | Rozman et al. | |
| 2007/0191730 A1* | 8/2007 | Speidel ......................... | 600/552 |
| 2008/0196912 A1* | 8/2008 | Gass et al. ........................ | 173/4 |
| 2010/0237814 A1 | 9/2010 | Bi et al. | |

OTHER PUBLICATIONS

UK Search Report dated Nov. 17, 2011.

* cited by examiner

*Primary Examiner* — Rina Duda
(74) *Attorney, Agent, or Firm* — Carlson, Gaskey & Olds, PC

(57) ABSTRACT

A drive system for a motor has a switching network for supplying three phases of power to a motor, and a control for the switching network. The control is programmed to provide a commutation with a positive offset, ahead of a current position, when driving in opposition to a load, and to use one of a zero or negative offset when the control drives the motor complementary to the load force. A method and system are also disclosed and claimed.

15 Claims, 1 Drawing Sheet

MOTOR BUS VOLTAGE COMMUTATION METHOD

BACKGROUND

This application relates to a motor bus voltage compensation method in a system wherein a motor drives a shaft against a mechanical load force.

Motor drive systems are known, wherein a control sends a signal to a switching network, or "drive bridge", that converts the supplied DC power to three-phase regulated power to drive a motor. A control section regulates power through and out of the switching network to regulate motor power and direction control. The control uses a position signal from a sensor on the motor shaft to determine the appropriate combination of signals and timing to the switching network to create the desired motion, otherwise known as the motor commutation. Often, the control will add a positive angular offset to a commutation signal to provide additional torque.

In some applications, the motor may drive a shaft in a first direction when actuated, while a mechanical bias, such as a spring, will return the shaft when the motor is deactivated. The motor may or may not be actively driven in the bias direction, depending on acceleration and velocity requirements.

The motor bus supplies power to the switching network. The motor bus power is supplied through an input power conditioner section. The input power conditioner may include a reverse current blocking diode to prevent power surges on the external power bus. In this case the power conditioner will also have power storage, such as a capacitor, to store power to and from the motor. A power conditioner may also contain rectifier circuitry to convert input power from AC to DC, and/or voltage regulation such as a buck or boost converter to control the motor bus voltage.

When the shaft is being driven in the reverse direction by the mechanical bias, reverse current flow can be generated from the motor back into the motor bus. This reverse current flow reaches the switching network and power conditioning section. The voltage spike provided by this reverse current flow can raise concerns at the switching network and power conditioning section. These concerns and the magnitude of the voltage spike are increased if the positive offset is still being added to the commutation signal.

It is more costly and requires more circuit board space to provide extra capacitance or an active voltage clamp to address this voltage spike.

SUMMARY

A drive system for a motor has a switching network for supplying three phases of power to a motor, and a control for the switching network. The control is programmed to provide a commutation with a positive offset, ahead of a current position, when driving in opposition to a load, and to use one of a zero or negative offset when the control drives the motor complementary to the load force. A method and system are also disclosed and claimed.

These and other features of the present invention can be best understood from the following specification and drawings, the following of which is a brief description.

DETAILED DESCRIPTION

Figure 1A:
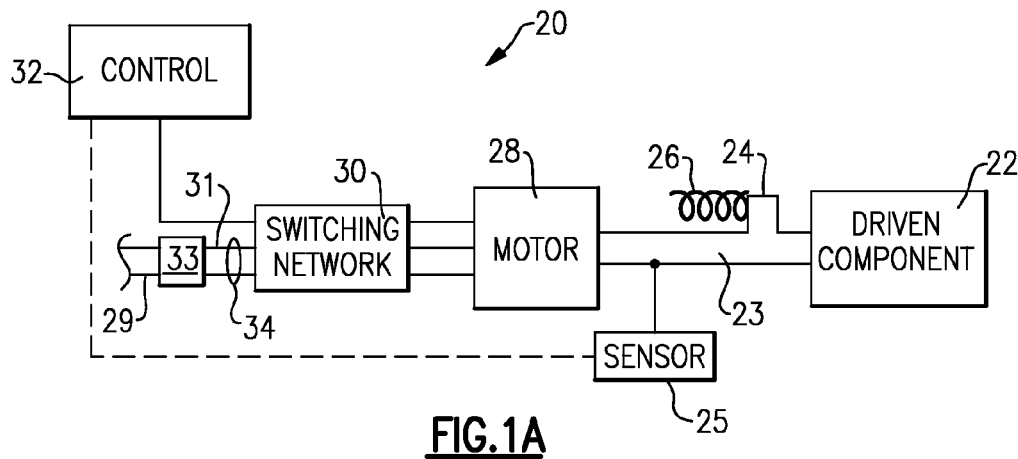
FIG. 1A schematically shows a motor drive system.

A rotary motor and drive system 20 is illustrated in FIG. 1A as an example. The motor drive includes a component 22 that is driven by a motor shaft 23 from a motor 28. A flange 24 is shown on the shaft 23 acting as a bias location for a spring 26 to apply a spring force (also generally referred to as a mechanical bias force). A position sensor 25 senses position of the shaft 23.

The motor 28 is a brushless DC motor. In one embodiment, it may be a WYE-connected (Y-connected) brushless DC motor. Generally, such motors are three-phase powered. On the other hand, delta-connected motors may also come within the scope of this application.

A switching network 30 (aka drive bridge) converts DC power from the motor bus 31 to three phases of power for the motor 28. A main bus 29, shown schematically, supplies power to a power conditioner unit 33. The power conditioner unit 33 converts power to be delivered to the motor bus 31, to be used by the switching network 30 for driving the motor 28. The power conditioner unit 33 may contain any of the following: a reverse power blocking diode, power storage such as capacitors, AC to DC rectification, and bus voltage regulation such as a buck or boost regulator. In this case, the power conditioner unit 33 does not allow flow from the motor bus 31 to the main bus 29. A control 32 sends commutation signals to the switching network 30.

Figure 1B:
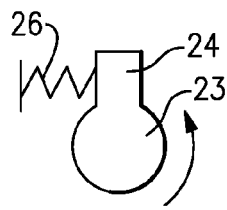
FIG. 1B schematically shows one feature of the FIG. 1A system.

As shown in FIG. 1B, the motor 28 drives the shaft 23 in a first direction (shown here as counter-clockwise, but of course it could be the opposed direction). The spring 26 biases the shaft 23 in an opposed direction. This simple depiction of flange 24 providing a bias surface for the spring 26 is merely a schematic example. Any number of ways of supplying a bias force to return the shaft 23 in a direction opposed to the motor drive direction may be utilized.

When the motor 28 is operational, it is able to overcome the spring force and drive the shaft 23. However, when the motor power is stopped, the spring 26 will drive the shaft in the opposed direction.

The example described is a rotary motor output, and other configurations, such as a linear motion output will benefit from this application. An example of such a system might be a motor driving a ball screw, or a linear motor with a linear opposing force. The opposing force may be a spring, fluid force, system momentum, etc.

One application for such a system may include the load 22 being an engine component such as a valve, which is driven to pivot, as known.

When the spring 26 drives the shaft 23 in the opposed direction, undesirable reverse current can be generated as described above.

Figure 2:
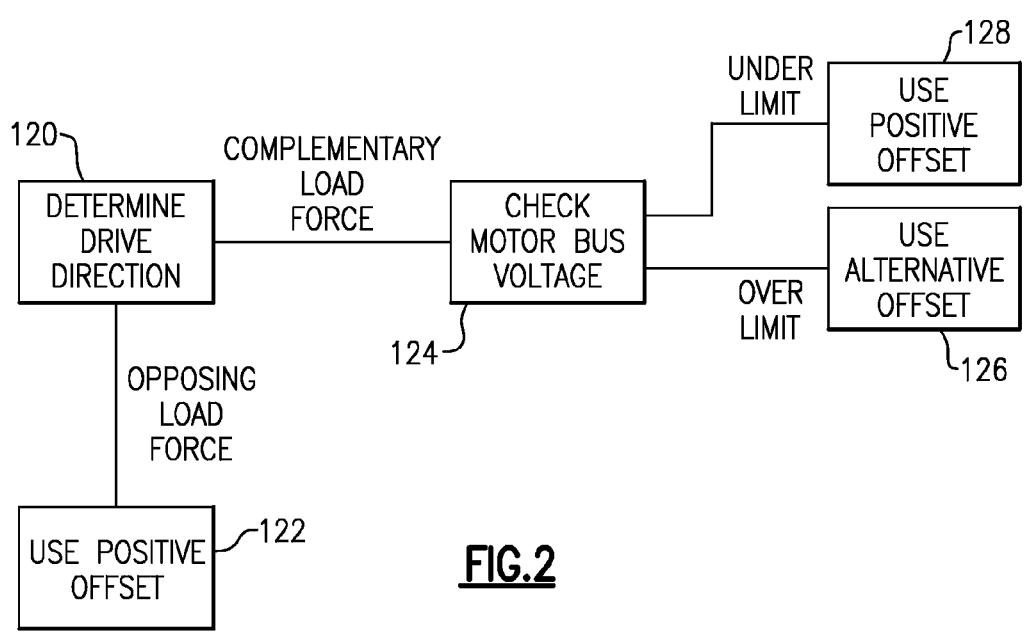
FIG. 2 is a flow chart.

The present invention relates to a method as shown in the flow chart of FIG. 2. As a first step 120, a direction of drive is determined. When the motor shaft 23 is driven against a load force, the control 32 will add a positive offset 122 to the shaft position signal coming from sensor 25. In the FIG. 1B example, this is the counter-clockwise direction. This offset is in the direction opposing the load force, ahead of the current position. The direction of load force can be detected by the amount of motor current being utilized, or by control configuration if the force is a fixed direction, such as a spring.

When the motor 28 is driven with (assisted by, or complementary to) the load force, the offset may be zeroed or given a negative value (in the direction opposing the load force) to reduce the net charge on a power storage capacitor of the power conditioner unit 33, thereby reducing the voltage on the motor bus 31. In FIG. 1B, this is clockwise.

Changing the commutation in this manner changes the motor current path and pulls the charge to ground through the motor 28, similar to the traditional motor braking method of bleeding off charge through resistors to ground, but without the additional hardware. The motor bus voltage may be monitored (step 124) to determine the value of offset needed. If the bus voltage exceeds a determined value or limit, the control 32 (at step 126) may use a zero commutation offset, or if more charge reduction is needed, a proportional negative offset may be calculated and used. The greater the negative offset, the greater the charge reduction. Velocity will be reduced by the negative offset, so it may need to be modulated or adjusted to achieve a compromise of safe bus voltage versus performance. Typically, the offset can be set up to one single motor pole position step beyond a current position. In some cases, a greater offset may be considered.

On the other hand, if the bus voltage is under the limit, then a positive offset (step 128) can be used.

A bus voltage sensor may be omitted, especially if the behavior of the system 20 is reasonably predictable using other system parameters. The offset in this case can be programmed to an appropriate value as determined by the system designer.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A drive system for a motor comprising:
a switching network for supplying three phases of power to a motor, and a control for said switching network, said control being programmed for a brushless motor;
said control being programmed to provide a commutation with a positive offset, ahead of a current position, when driving in opposition to a load, and using one of a zero or negative offset, when the control drives the motor complementary to the load force.

2. The system as set forth in claim 1, wherein said offset is a zero offset.

3. The system as set forth in claim 1, wherein said offset is a negative offset.

4. The system as set forth in claim 1, wherein said motor is a rotary motor driving a shaft.

5. The system as set forth in claim 4, wherein a sensor senses the current position of said shaft and provides feedback to said control such that said control can drive the switching network with a commutation offset, positive, zero or negative as appropriate.

6. The system as set forth in claim 1, wherein a mechanical bias force is provided complementary to the load.

7. A motor and drive assembly comprising:
a rotary motor driving a shaft in a first direction when driven, and a load force biasing said shaft in a second direction;
a switching network supplying three phases of power to said rotary motor; and
a control programmed to provide a first signal when said rotary motor is driving the shaft in the first direction, said first signal adding an angular offset to a commutation signal supplied to the switching network, and said control being provided with an alternative offset for use when rotation in the second direction is sensed.

8. The motor and drive assembly as set forth in claim 7, wherein said alternative offset is a zero offset.

9. The motor and drive assembly as set forth in claim 7, wherein said alternative offset is a negative offset.

10. The motor and drive assembly as set forth in claim 7, wherein a sensor senses the position of the shaft and provides feedback to said control such that said control can drive the switching network with either the first signal or the alternative offset.

11. The motor and drive assembly as set forth in claim 7, wherein said shaft is driven by a spring in the second direction.

12. A method of operating a motor drive assembly including the steps of:
supplying three phases of power to a motor through a switching network, said motor driving a shaft in a first direction, and the shaft biased in a second direction, opposed to the first direction; and
providing control signals to the switching network when said motor is driving the shaft in the first direction, said first signals having a positive commutation offset, and providing an alternative offset when said motor is driven in the second direction.

13. The method as set forth in claim 12, wherein said alternative offset is a zero offset.

14. The method as set forth in claim 12, wherein said alternative offset is a negative offset.

15. The method as set forth in claim 12, wherein a sensor senses the position of the shaft and provides feedback to said control such that said control can drive the switching network with either the first signal or the alternative offset.

* * * * *